(12) United States Patent
Leichty et al.

(10) Patent No.: US 11,340,965 B2
(45) Date of Patent: May 24, 2022

(54) METHOD AND SYSTEM FOR PERFORMING VOICE ACTIVATED TASKS

(71) Applicant: BOOMERSURF LLC, Gainesville, VA (US)

(72) Inventors: Joshua Simon Leichty, South Riding, VA (US); Paula Adelman, Gainesville, VA (US)

(73) Assignee: BOOMERSURF, LLC, Gainesville, VA (US)

( * ) Notice: Subject to any disclaimer, the term of this patent is extended or adjusted under 35 U.S.C. 154(b) by 0 days.

(21) Appl. No.: 16/836,642

(22) Filed: Mar. 31, 2020

(65) Prior Publication Data

US 2020/0310891 A1 Oct. 1, 2020

Related U.S. Application Data

(60) Provisional application No. 62/827,304, filed on Apr. 1, 2019.

(51) Int. Cl.
| | |
|---|---|
| *G06F 3/00* | (2006.01) |
| *G06F 9/54* | (2006.01) |
| *G06F 3/16* | (2006.01) |
| *H04L 29/06* | (2006.01) |
| *G06F 21/44* | (2013.01) |

(52) U.S. Cl.
CPC .............. *G06F 9/542* (2013.01); *G06F 3/167* (2013.01); *G06F 21/44* (2013.01); *H04L 63/0807* (2013.01)

(58) Field of Classification Search
CPC ...................................................... G06F 9/541
USPC .......................................................... 719/328
See application file for complete search history.

(56) References Cited

U.S. PATENT DOCUMENTS

| | | | | |
|---|---|---|---|---|
| 9,271,110 | B1* | 2/2016 | Fultz | H04W 12/06 |
| 2013/0019149 | A1* | 1/2013 | Spencer | G11B 27/034 |
| | | | | 715/202 |
| 2016/0277413 | A1* | 9/2016 | Ajitomi | H04L 63/105 |
| 2016/0378853 | A1* | 12/2016 | Mohammad | G06F 16/3344 |
| | | | | 707/706 |
| 2019/0327236 | A1* | 10/2019 | Ahuja | H04L 9/3247 |
| 2020/0007615 | A1* | 1/2020 | Brebner | H04L 67/10 |

OTHER PUBLICATIONS

Roland Schlöglhofer, Secure and Usable Authentication on Mobile Devices. (Year: 2012).*
Ramesh Puljala, Middleware: Single Sign On Authentication and Authorization for Groups. (Year: 2014).*
Trio Adiono, An Inter-Processor Communication (IPC) Data Sharing Architecture in Heterogeneous MPSoC for OFDMA . (Year: 2018).*

* cited by examiner

*Primary Examiner* — Lechi Truong

(57) ABSTRACT

A computerized platform provides centralized access for users to for on-line (electronic) services, such as social media, travel, education, and online banking including payments, via public Application Programming Interfaces (APIs).

14 Claims, 9 Drawing Sheets

METHOD AND SYSTEM FOR PERFORMING VOICE ACTIVATED TASKS

CROSS REFERENCE TO RELATED APPLICATION

This application is related to and claims priority from commonly owned U.S. Provisional Patent Application Ser. No. 62/827,304, entitled: Method and System for Performing Voice Activated Tasks, filed on Apr. 1, 2019, the disclosure of which is incorporated by reference in its entirety herein.

TECHNICAL FIELD

The present invention is directed to systems and methods for performing computer-based tasks based on voice recognition.

BACKGROUND

Many people are intimidated by computers, including smart phones, tablets, iPads®. As a result, these individuals fail to realize all of the potential, such as social media, online travel and banking, that computers can offer.

SUMMARY

The present invention is directed to a computerized platform which provides centralized access for users to for on-line (electronic) services, such as social media, travel, education, and online banking including payments, via public Application Programming Interfaces (APIs).

Embodiments of the invention are directed to a computerized method for performing tasks associated with an electronic service. The method comprises: receiving a request to perform a task from a device, the performance of the task at an electronic destination; authenticating the device; should the device be authenticated, storing the request; and, generating an Application Program Interface (API) command for performing the task of the request, the command when executed: 1) causing the device to accesses the electronic destination associated with the request, and, 2) causing the device to perform the request to provide access to features of the electronic destination at a different electronic destination.

Optionally, the method is such that the request is received via audio.

Optionally, the method is such that the request is received via at least one of text or menu selection.

Optionally, the method is such that it additionally comprises: transmitting the API command to the device for execution by the device.

Optionally, the method is such that the device includes at least one of: a smartphone, a computer, a desktop computer, a tablet computer, and a laptop computer.

Optionally, the method is such that the authenticating the device includes, receiving an identification (ID) from the device indicative of the device, and approving the identification to authenticate the device.

Optionally, the method is such that the identification includes a token.

Optionally, the method is such that the electronic destination includes at least one of a web page, a server, and a computer.

Optionally, the method is such that the at least one of the web page, server or computer are associated with social media.

Embodiments of the invention are directed to a computer system for performing tasks associated with an electronic service. The computer system comprises: a computerized processing unit; and, a non-transitory storage media for storing computer components for in communication with the computerized processing unit. The computer components comprise: a first component for receiving a request to perform a task from a device, the performance of the task at an electronic destination, a second component for authenticating the device; and, a third component for generating an Application Program Interface (API) command for performing the task of the request, the command when executed: 1) causing the device to accesses the electronic destination associated with the request, and, 2) causing the device to perform the request to provide access to features of the electronic destination at a different electronic destination, should the device be authenticated.

Optionally, the computer system is such that the first component is configured to receive the request via audio.

Optionally, the computer system is such that the first component is configured to receive the request via at least one of text or menu selection.

Optionally, the computer system is such that it additionally comprises: a fourth component for transmitting the API command to the device for execution by the device.

Optionally, the computer system is such that the authenticating the device includes, receiving an identification (ID) from the device indicative of the device, and approving the identification to authenticate the device.

Optionally, the computer system is such that the identification includes a token.

Embodiments of the invention are directed to a computer usable non-transitory storage medium having a computer program embodied thereon for causing a suitably programmed system to perform tasks associated with an electronic service, by performing the following steps when such program is executed on the system. The steps comprise: receiving a request to perform a task from a device, the performance of the task at an electronic destination; authenticating the device; should the device be authenticated, storing the request; and, generating an Application Program Interface (API) command for performing the task of the request, the command when executed: 1) causing the device to accesses the electronic destination associated with the request, and, 2) causing the device to perform the request to provide access to features of the electronic destination at a different electronic destination.

Optionally, the computer usable non-transitory storage medium is such that the request is received via audio.

Optionally, the computer usable non-transitory storage medium is such that the request is received via at least one of text or menu selection.

Optionally, the computer usable non-transitory storage medium is such that the steps additionally comprise: transmitting the API command to the device for execution by the device.

This document references terms that are used consistently or interchangeably herein. These terms, including variations thereof, are as follows.

Throughout this document, a "web site" is a related collection of World Wide Web (WWW) files that includes a beginning file or "web page" called a home page, and typically, additional files or "web pages." The term "web site" is used collectively to include "web site" and "web page(s)."

A uniform resource locator (URL) is the unique address for a file, such as a web site or a web page, that is accessible over Networks including the Internet.

"n" and "n$^{th}$" in the description below and the drawing figures represents the last member of a series or sequence of members, such as elements, servers, databases, caches, components, listings, links, data files, and the like.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smart phone, personal digital assistant (PDA), mobile telephone or cellular telephone).

A "server" is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION

Figure 1:
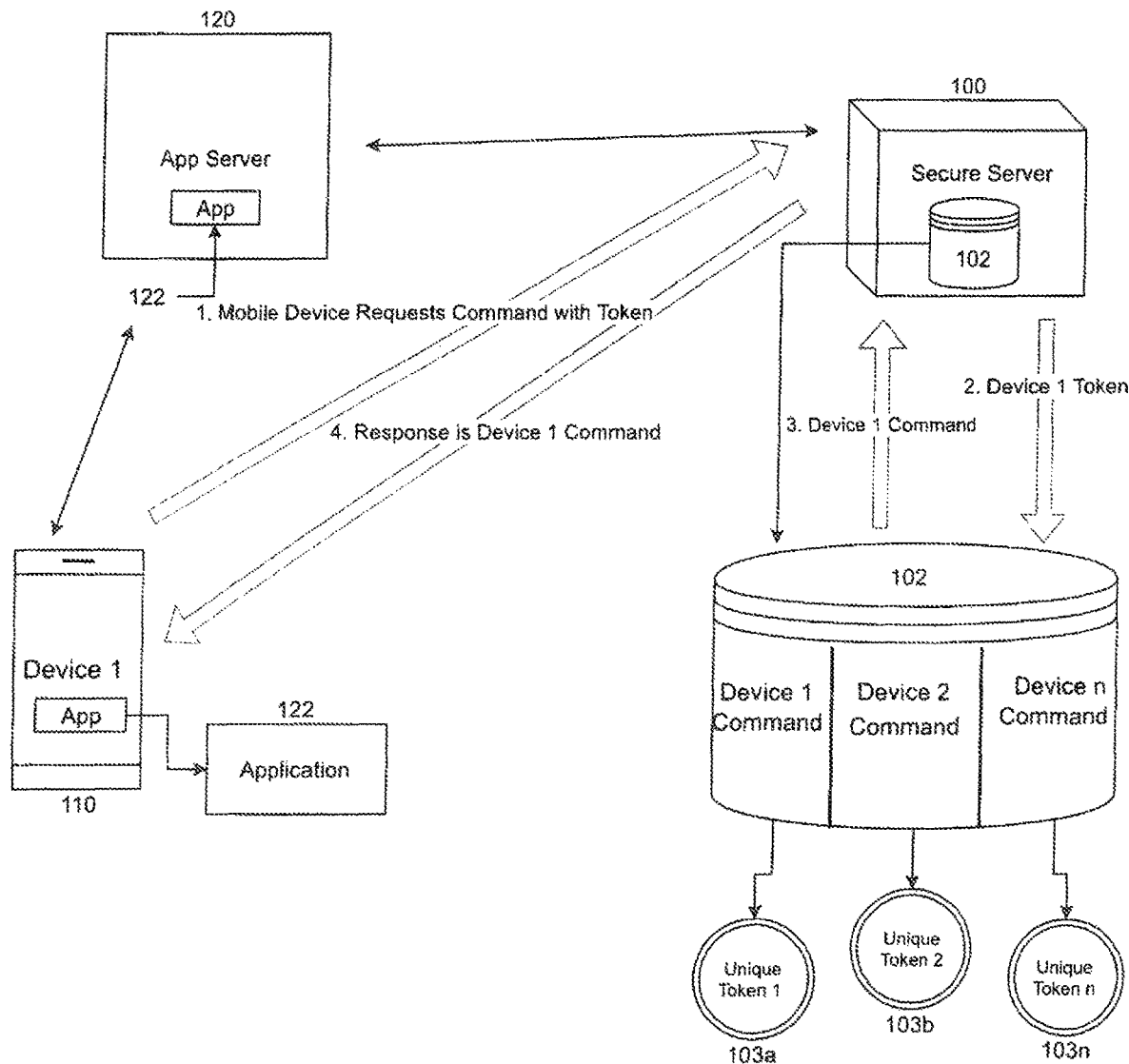
FIG. 1 is a diagram of an exemplary environment for the system in which embodiments of the disclosed subject matter are performed.

Before explaining at least one embodiment of the invention in detail, it is to be understood that the invention is not necessarily limited in its application to the details of construction and the arrangement of the components and/or methods set forth in the following description and/or illustrated in the drawings. The invention is capable of other embodiments, being practiced, or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, and the like) or an embodiment combining software and hardware aspects that may all generally be referred to herein as a "circuit," "module" or "system." Furthermore, aspects of the present invention may take the form of a computer program product embodied in one or more non-transitory computer readable (storage) medium(s) having computer readable program code embodied thereon.

Throughout this document, numerous textual and graphical references are made to trademarks, and domain names. These trademarks and domain names are the property of their respective owners, and are referenced only for explanation purposes herein.

Reference is now made to FIG. 1, which shows an exemplary operating environment, including a home server (HS) 100, also known as a main server. The home server 100 is, for example, one or more computers, and includes a system 100' which includes hardware and software for receiving voice commands and performing the processes disclosed herein. The home server 100 and system 100' also include an engine 102 for issuing tokens 103a-103n (represented generally by element number 103), unique from each other, associated with each device 110. The device 110 is representative of multiple devices which interact with the server 100. The device 110 includes, for example, a computer, such as a smart phone, desktop computer, laptop computer, tablet computer, voice assistant, and the like. The tokens 103a-103n are pieces of data which allow for secure interactions between the server 100 and each device 110. There is also an application server 120, through which the application (APP) 122 interacts with the server 100 to perform the voice-activated or other activated computerized tasks disclosed herein. The devices 110 communicate with the server 100 over a communication system such as a network, including a wide area of public networks such as the Internet. The home server 100, including the engine 102, also links to the Application Server 120, which links to one or more aforementioned networks.

Each token 103a-103n is associated with a unique session between a device 110 and the server 100 and its system 100', where for example, data is transmitted therebetween. The token 103 allows the session to be secure. The token also serves as a password for logging in the device to the system 100. For example, the token 103 is stored on the device 110. Accordingly, a device 110 must be signed into the server 100 in order to make a request to perform a computerized task, e.g., make a Skype® call (with Skype® representative of an electronic service, at an electronic destination, e.g., the server(s) hosting Skype®, accessible over computer networks, such as the Internet). The server 100 is also configured to handle interactions with electronic services, such as social media, including, for example, as Facebook®, LinkedIn®, WhatsApp®, Twitter®, Skype®, and the like. By using the server 100, all voice commands from the respective devices 110, are activated through a central location. For example, there is a universal activating word for the application, which would start the listener, for example "BOOMERSURF".

Here, there is an integration of universal activation command with voice activated devices. For example, there is a universal activating word for the application. However, if the user is interacting with Boomersurf through a voice activated device, like Google Home™, or Amazon® Echo®, the default activating word will change to the device's activating word.

The system 100' of the invention performs a series of processes in order to perform the user-desired computer-based (electronic) task. The processes are performed in a sequence of an exemplary order as follows. Initially, a device 110, which has downloaded the application (APP) 122, and the application 122 is running on the device 110, requests a command with a token to the home server 100. The home server 100, via the engine 102, then issues a token, i.e., token 103a for this particular device 110, associated with a particular command, e.g., "make a Skype call to Pat". The engine 102 then authenticates and executes the command from the device 110. The server 100 then responds by performing the command, and linking the performance of the command to the device 110.

Figure 2:
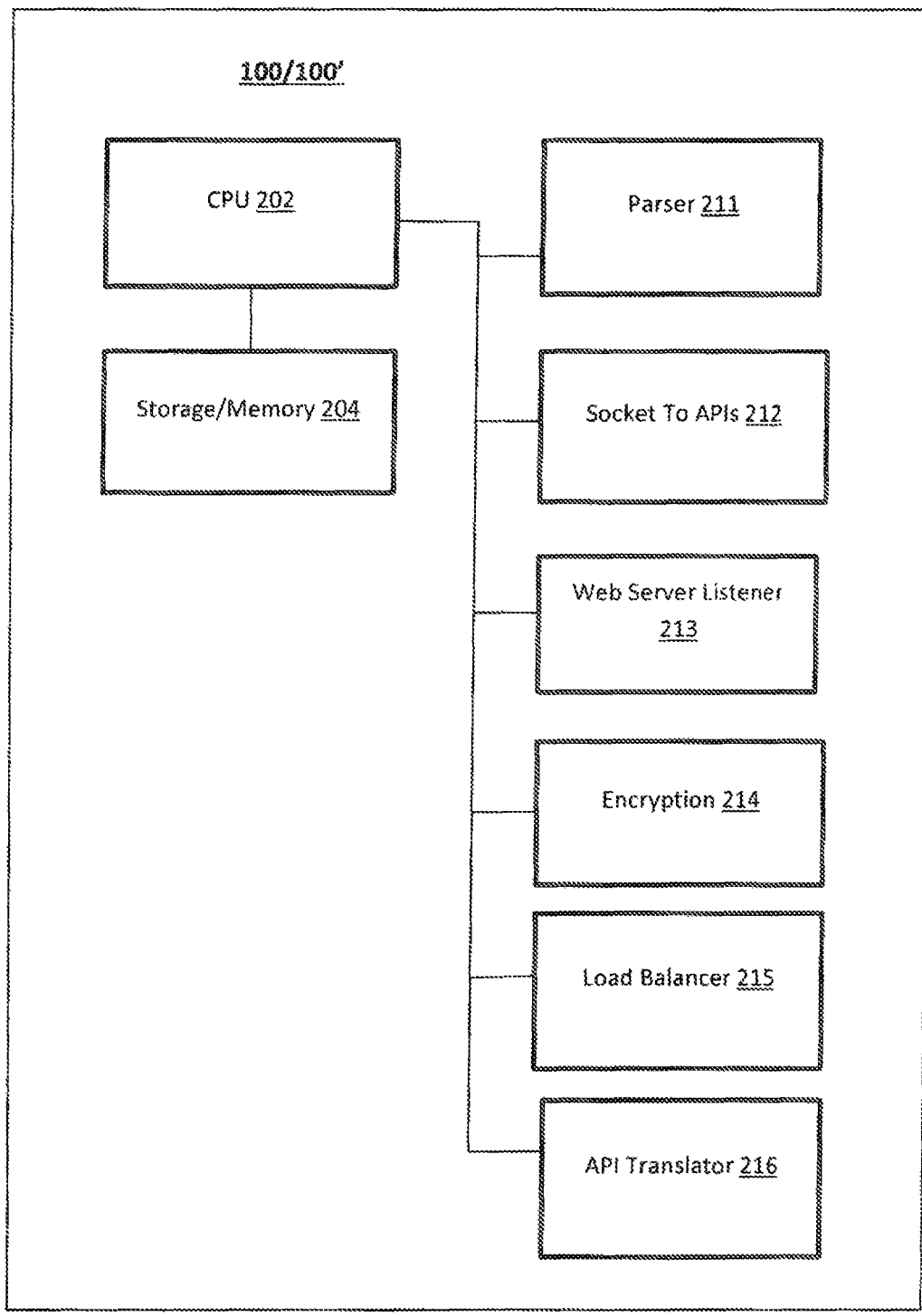
FIG. 2 is a diagram of the architecture of the home server of FIG. 1 and the system thereof; and, FIGS. 3A-5C are flow diagrams of example processes in accordance with embodiments of the present invention.

Attention is now directed to FIG. 2, which shows the architecture of the system 100', for example, in the home server 100. This architecture of the system 100', as shown, for example, in the home server 100, includes a central processing unit (CPU) 202 formed of one or more processors, electronically connected, including in electronic and/or data communication with storage/memory 204, a parser 211, socket to Application Program Interfaces (APIs) 212, a Web Server Listener Module 213, an Encryption Module 214, a Load Balancer (Load Balancer Module) 215, and an API translator module 216. The aforementioned components are linked so as to be in direct or indirect electronic and/or data communication with each other.

The Central Processing Unit (CPU) 202, also known as a computerized processing unit, is formed of one or more processors, including microprocessors, for performing the home server 100 and system 100' functions and operations detailed herein, including controlling the aforementioned components 211-216. The processors are, for example, conventional processors, including hardware processors, such as those used in servers, computers, and other computerized devices. For example, the processors may include x86 Processors from AMD and Xenon® and Pentium® processors from Intel, as well as any combinations thereof.

The storage/memory 204, or storage media, is any conventional storage media. The storage/memory 204 stores machine executable instructions for execution by the CPU 202, to perform the processes of the invention. The storage/memory (storage media), for example, is non-transitory, and stores, or is otherwise associated with, computer components, e.g., components 211-216, and, for example, is in electronic and/or data communication with the CPU 202 (computerized processing unit). The storage/memory 204 also includes machine executable instructions associated with the operation of the aforementioned components 211-216, and may serve as temporary storage. The storage/memory 204 also, for example, stores rules and policies for the system 100' and the home server 100. The processors of the CPU 202 and the storage/memory 204, although shown as a single component for representative purposes, may be multiple components, and may be outside of the home server 100 and/or the system 100', and linked to the network.

The Parser 211 serves to parse voice and other oral commands, as well as text commands.

The socket to the APIs 212 serves to facilitate communications between the APIs and the various servers and applications used in performing the processes detailed herein.

The web server listener module 213 functions to listen for commands, and activate in order to send the commands for processing.

The encryption module 214 functions to encrypt secure connections, which Boomersurf handles from the user. For example, a social media API request needs to be encrypted because it includes the user's User Name and Password.

The load balancer 215 functions to distribute application traffic across various servers. This increases traffic and reliability of applications.

The API translator 216 functions to provide local and cloud translations associated with the commands.

Figure 3A:
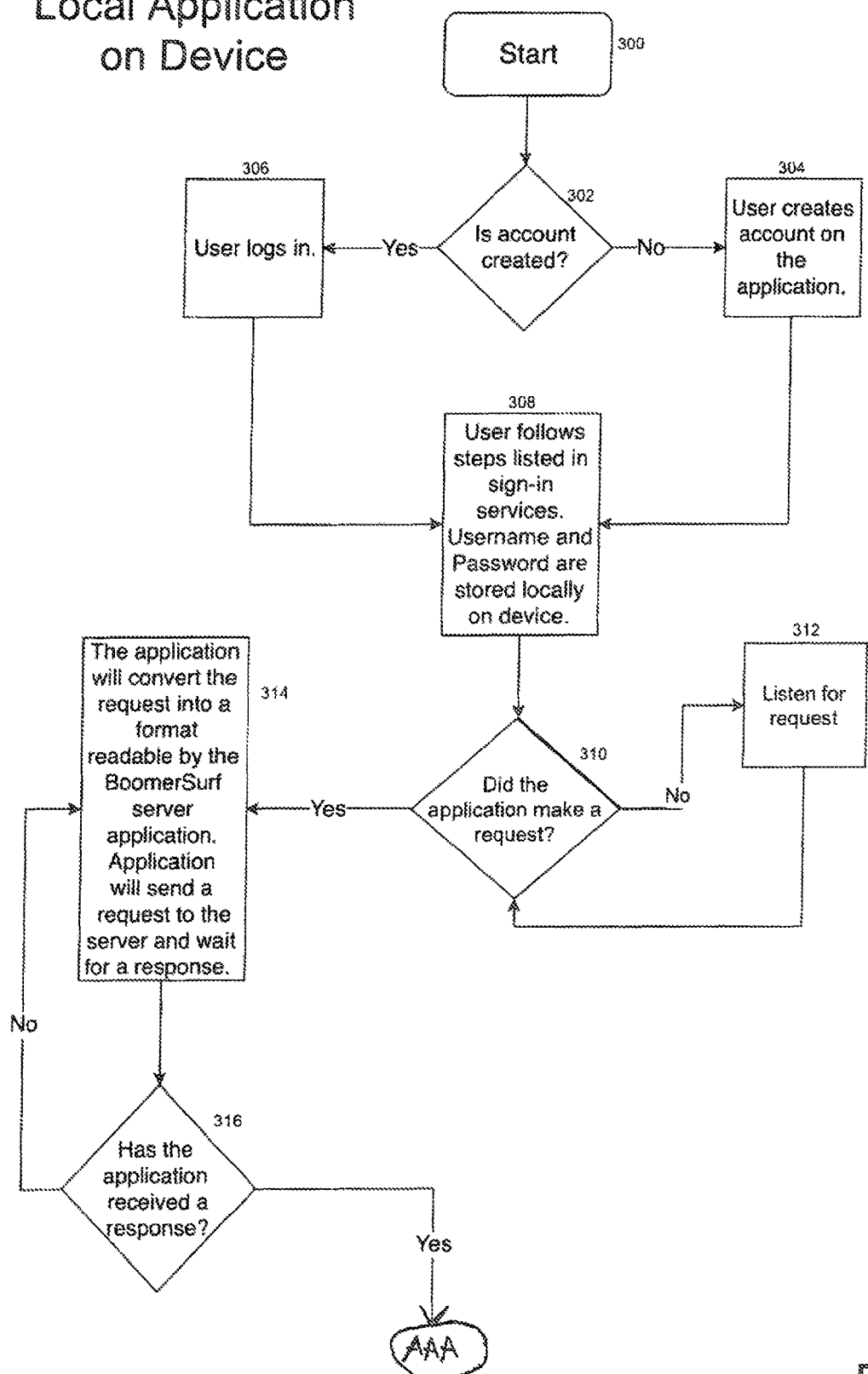
Figure 3B:
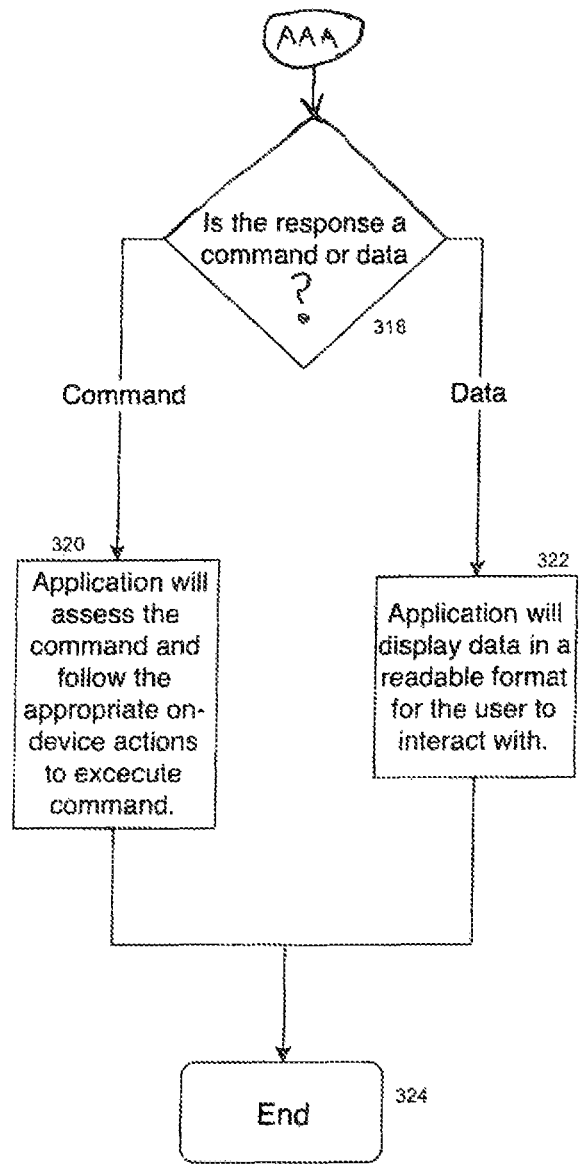

Attention is now directed to FIGS. 3A and 3B, a flow diagram detailing a process for the application 122 when it is running (executing) on the device 110. At the START 300, the application 122 is installed on the device 110 and is running (executing). At block 302, it is determined whether a Boomersurf account has been created. If no, the device 110 user creates an account by standard account creation procedures, at block 304. If yes, an account for this user has been created, and the user logs into the system as block 306. From both block 304 and block 306, the process moves to block 308, where the user accesses the system 100' by, for example, following a sign in service protocol, shown, for example, as a process of FIG. 4, and the username and password are stored as a token 103, locally on the device 110.

The process moves to block 310, where the system 100' determines whether the application 122 has made a request to the system 100'. If yes, the process moves to block 314, where the application 122 automatically converts the request into a format readable by the home server 100. For example, the application 122 automatically sends a request for data or to perform a command—to the home server 100 and waits a predetermined time for a response. If no response is received at block 310, the process moves to block 312, where the system listens for a request. The process of block 312 then moves to block 310, from where it resumes.

From block 314, the process moves to block 316, where it is determined whether the application has received a response. If no, the process returns to block 314, and repeats from block 314. If yes, at block 316, the process moves to block 318, where it is determined whether the received response is a command or data.

If the response is a command, the process moves to block 320, where the application accesses the command and follows the appropriate on-device actions to execute the command.

If the response is data, the process moves to block 322, where the application causes data to be displayed in a readable format so as to prompt user interaction.

From both blocks 320 and 322, the process moves to block 324 where it ends.

Figure 4A:
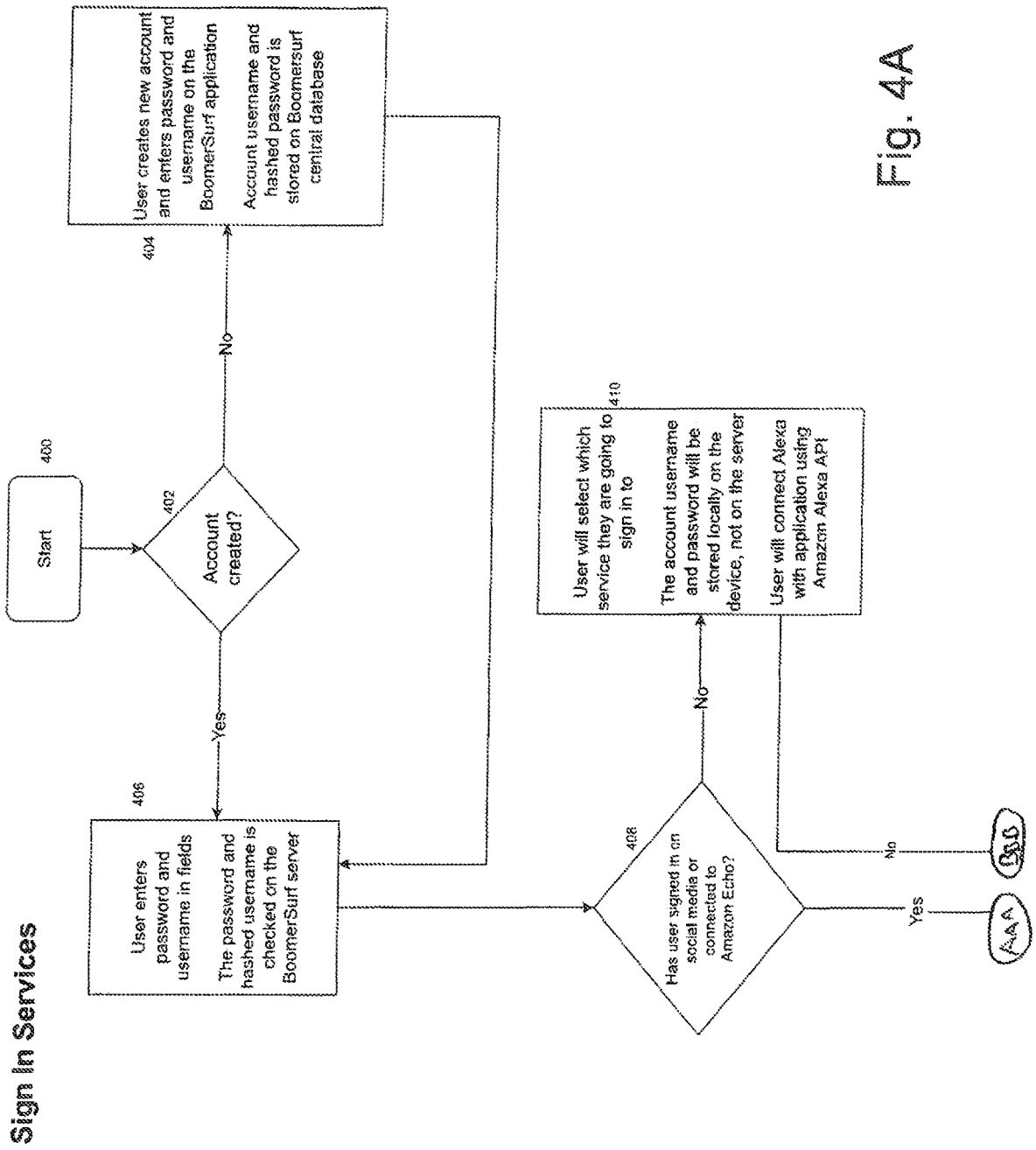
Figure 4B:
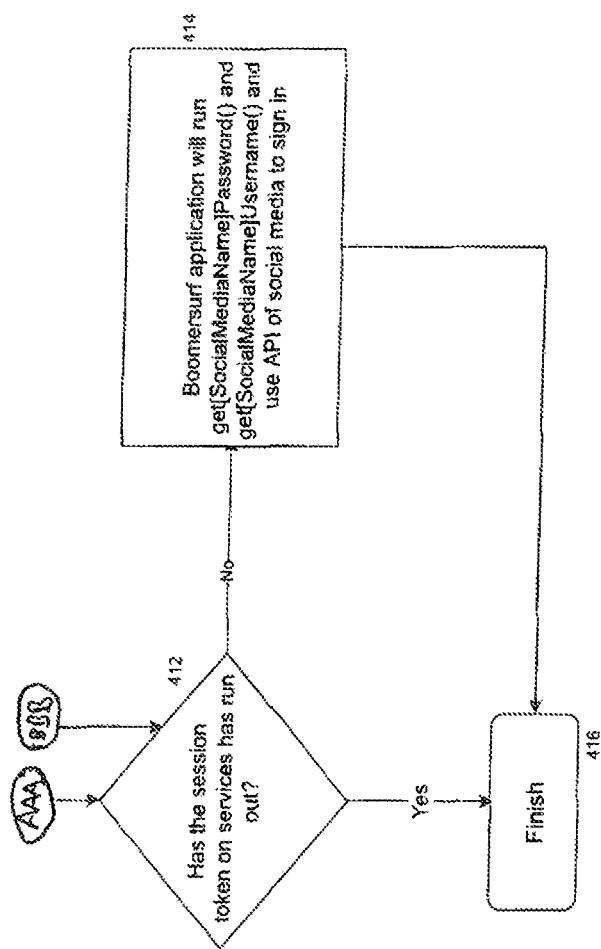

Turning back to block 308, the process of sign in services is performed. The process, as shown in FIGS. 4A and 4B, begins at the START block 400, where the user, for example, via his device 110, is considered to be signed in to the home server 100, from block 308. The process moves to block 402, where the system determines whether an account for the requesting user has been created. If no at block 402, the process moves to block 404, where an account is created on the task-performing server 100, e.g., Boomersurf. If yes, the process moves to block 406, where the user enters his password, and the password is authenticated on the task-based server, e.g., Boomersurf. Also, at block 404, should the user successfully register, the process moves to block 406.

From block 406, the process moves to block 408, where it is determined whether the user has signed in on social media, e.g., Facebook®, LinkedIn® or the like, or connected to a voice (activated) assistant, such as Alexa®, Siri®, or the like. If no at block 408, the process moves to block 410, where the user selects the service they will sign in to. The username and account passwords are stored locally on the device 110 (once an accounts is signed into, there is no need to sign into the account again) and the user connects to the voice activated service, using a corresponding application program interface (API). If yes, at block 408, the process moves to block 412, where it is determined whether the session token on the services has timed out. Also, from block 410, the process moves to block 412.

From block 412, if no, the process moves to block 414, where the server application runs to cause sign in at the task-performing server 100. If yes at block 412 and from block 414, the process moves to block 416, where it ends. The process then moves to block 310, from where it resumes as detailed above.

Figure 5A:
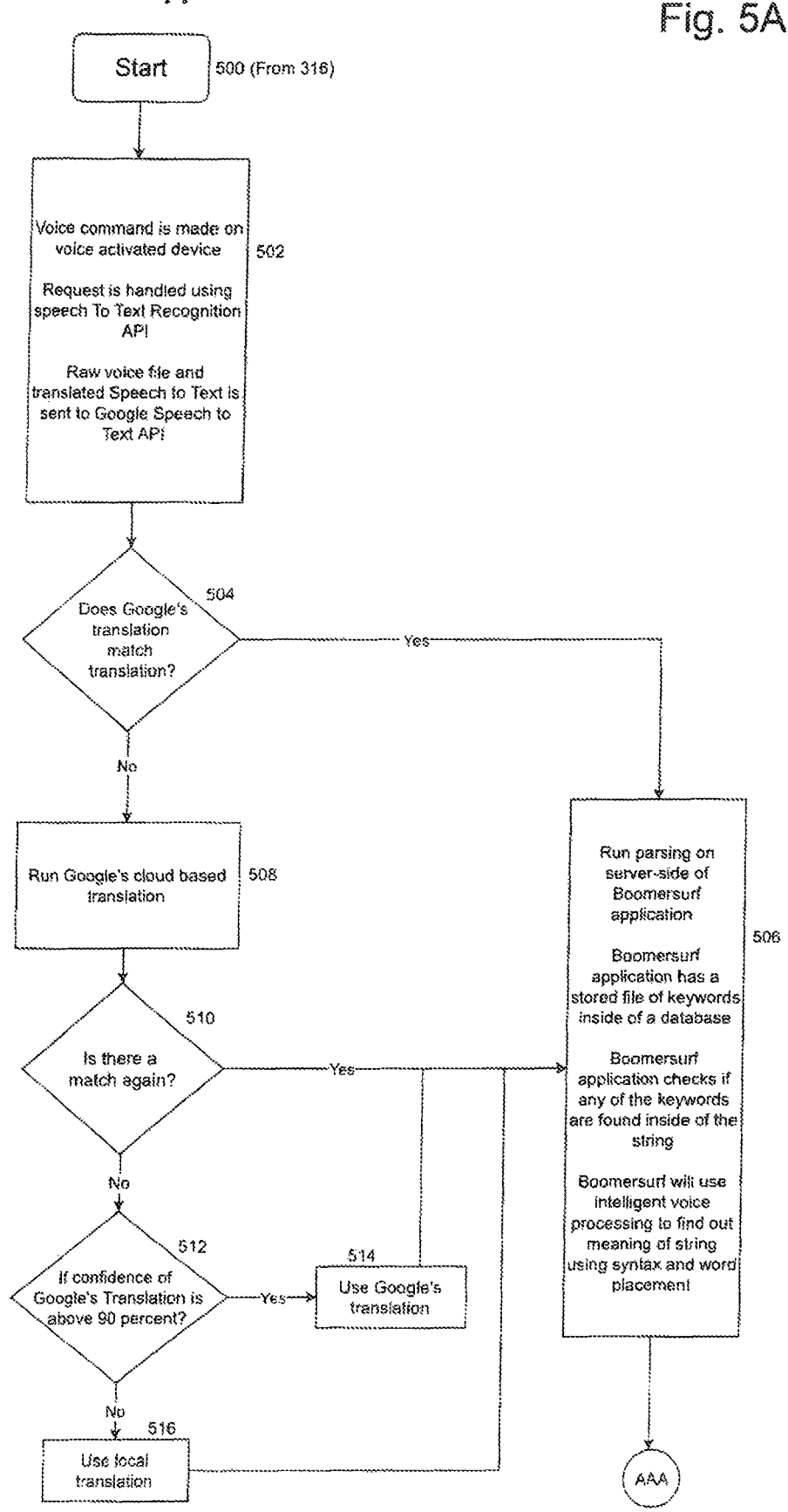
Figure 5B:
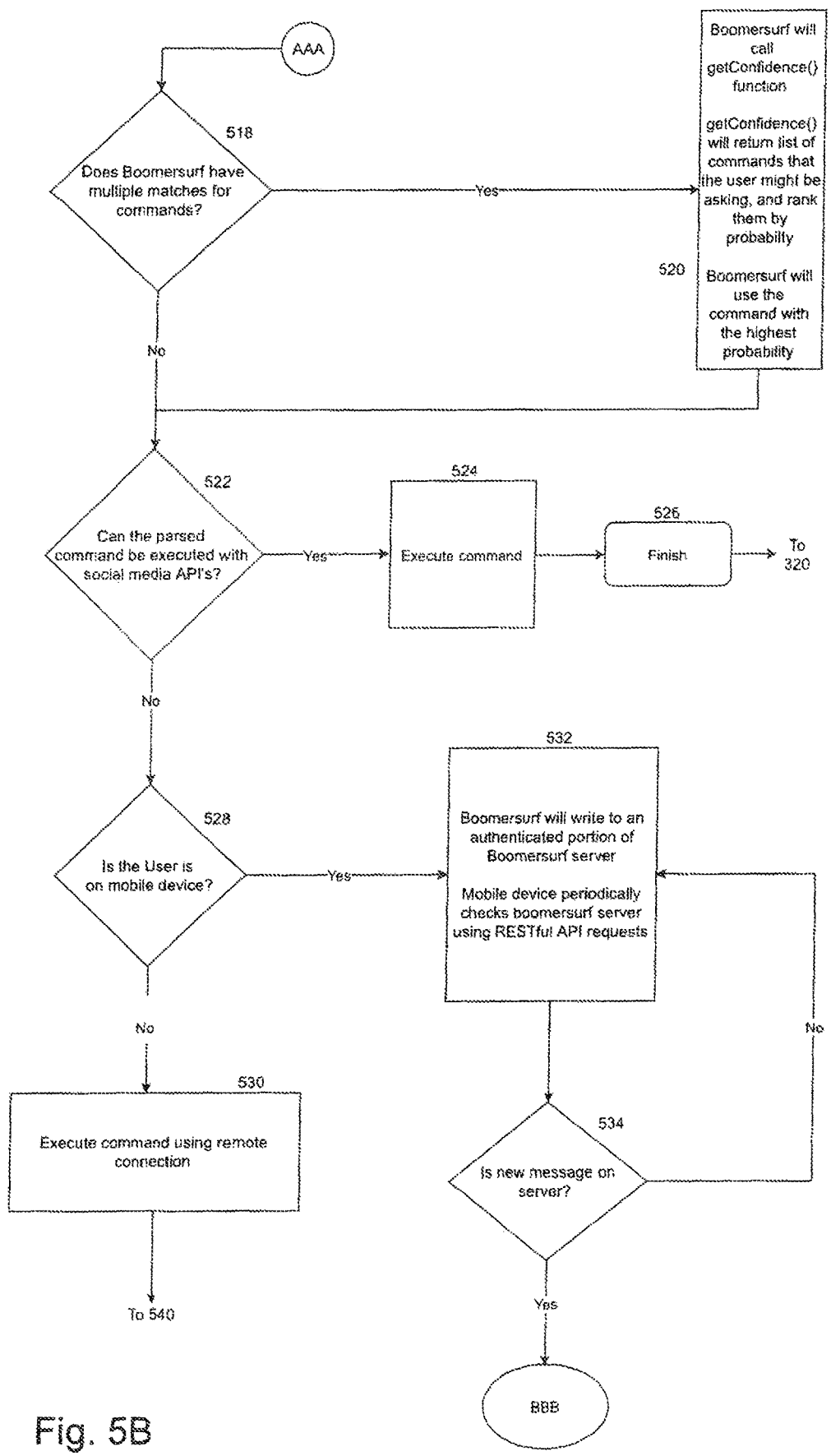
Figure 5C:
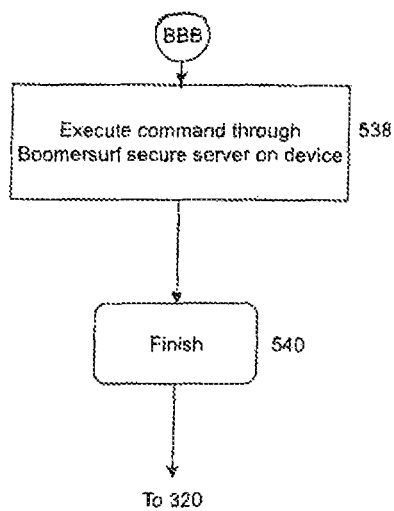

Attention is now directed to FIGS. 5A-5C, a flow diagram of a process performed by the server 100 to the application 122 on the device 110. The process begins at the START block 500. The process moves to block 502, where a voice command is made on a voice activated a device, such as a smartphone, computer, tablet computer, or a voice assistant, which processes the request using a speech to text recognition API, such as Google® Local Speech to Text API (https://cloud.google.com/speech-to-text/), to create a local translation The raw voice file and the translated local speech to text is checked by an API, for example, Google® speech to text API.

The process moves to block 504, where it is determined whether the Speech to Text API's translation matches the local translation of the speech from the user of the device 110, at block 504.

If yes, at block 504, the process moves to block 506, where parsing is run on the server side of the task-server, e.g., Boomersurf, application. The application checks for keywords, and the Boomersurf application uses intelligent voice processing to determine the meaning of the string using syntax and word placement.

If no at block 504, the process moves to block 508, where Google's® cloud based translation is run, the process moves to block 510, where it is determined whether there is a translation match. If yes at block 510, the process returns to block 506, from where it resumes. If no at block 510, it is determined whether there is a predetermined threshold of confidence in Google's® translation, at block 512. If yes at block 512, Google's® translation is used, at block 514, and the process moves to block 506, from where it resumes. If no at block 512, the process moves to block 516, where the voice assistant's local translation is used, and the process moves to block 506, from where it resumes.

From block 506, the process moves to block 518, where it is determined whether the Boomersurf server 100 has multiple matches for the commands. If yes, the process moves to block 520, where the Boomersurf Application will call a getConfidence( ) function, available from GOOGLE of Palo Alto, Calif. The getConfidence( ) function will return a list of commands, which match what the user is asking, and rank these commands by probability. If not selected by the user, the Boomersurf server 100 will use the command with the highest probability (which is the highest ranked on the list).

If no at block 518, and from block 520, the process moves to block 522, where the command is parsed and it is determined whether the parsed command is executable with social media APIs. If yes at block 522, the command (e.g., an API command) is executed at block 524 and the process moves to block 526 where it ends. If no at block 522, the process moves to block 528, where it is determined whether the user is on his mobile device.

If no at block 528, the process moves to block 530, where commands (e.g., API Commands) are executed using a remote connection. The process of block 530 then moves to block 528, from where it resumes. If yes at block 528, the process moves to block 532, where the Boomersurf application (APP) writes to an authenticated portion of the Boomersurf server 100 and the mobile device checks the Boomersurf server 100 (and system 100') using RESTful API requests, at predetermined intervals.

The process moves to block 534, where it is determined whether there is a new message on the server. If no, the process moves to block 532, from where it resumes. If yes, the process moves to block 536 where it executes the processes of FIG. 1. From block 536, the process moves to block 538, where the command (e.g., API command) is executed through the Boomersurf server 100 by and on the device 110. For example, the command, when executed by the device 110, via the server 100, is such that the device 110 accesses the electronic destination, e.g., web page, server, computer, or component, such as a database in a server or computer, associated with the request, and, the device then performs the request (associated with the command) to provide the device or another electronic destination access to features of the electronic destination.

The process then moves to block 540, where it ends. The process may be repeated for as many iterations (cycles) as desired.

Examples

The following two examples detail a user interacting with the home server 100, e.g. Boomersurf.

This example details receipt of an image using WhatsApp® (an electronic service hosted by one or mere servers (an electronic destination) accessible over a communications (computer) network, such as the Internet).

The process begins at block 300, and moves to block 302, where an account associated with a user device, e.g., a smart phone, computer, voice assistant and/or the like, has been created. The process moves to block 306, where the user, via his device 110, has logged in to the system 100'. The process moves to block 308, which includes, block 408 to block 416 (block 306 includes blocks 402, 406 and 408).

At block 408, the user (via his device 110) has signed into any social media and has connected to any voice activated device. The process moves to block 410, the user's name and password are stored locally on the device, such that the user receives instant access. The user selects the service they will sign into, for example, via a pop-up menu. For example, the user selects the service WhatsApp®. The process moves to block 412, where the session token has not run out, and accordingly, is active or live, and the process ends at block 416, from where the process moves to block 310. At block 310, the user makes a voice request, for example, to receive the latest image from their son via WhatsApp®. As the application (downloaded onto the device 110) made a request at block 310, the process moves to block 314, where the application converts the request into a format readable by the home server 100, and the application sends a request to the home server and waits for a response. With a response received, at block 316, the process moves to block 500, and to block 502.

At block 502, The application receives the voice data and the translation, and checks it against Google's translation and it matches, at block 504. The process moves to block 506, where the application parses the voice and recognizes that it should respond to the local device with the most recent picture from the user's contact, with the property of "Son." The process moves to block 518, where it is determined that the home server 100 has multiple matches for commands, e.g. API (Application Program Interface) commands, which are generated, for example, by the home server 100. Here, there is only a single match, so the process moves to block 522. At block 522, the device 110, through the home server 100 (and system 100') executes the command (i.e., API command) as the device asks the WhatsApp server for the most recent picture from the requested contact. The device 110 receives the image, resulting from the API command executed by the device 110, at block 524. The process is completed at block 526 when the WhatsApp® server sends the image (e.g., a feature from an electronic data from the WhatsApp® server) back to the device 110. The process now moves to block 318.

At block 318, the WhatsApp® is data and accordingly, the process moves to block 322, where the application displays the data in a readable format to the user (on the device 110) for interaction. The process moves to block 324 where it ends.

This example details receipt of an image using Twitter®.

The process begins at block 300, and moves to block 302, where an account has been created. The process moves to block 306, where the user has logged in. The process moves to block 308, the user follows the steps listed in the application provided sign in services. The process moves to block 308, which includes, block 408 to block 416 (block 306 includes blocks 402, 406 and 408).

At block 408, the user has signed into any social media and has connected to any voice activated device. The process moves to block 410, the user's name and password are stored locally on the device, such that the user receives instant access. The user selects the service they will sign into, for example, via a pop-up menu. For example, the user selects the service Twitter®. The process moves to block 412, where the session token has not run out, and accordingly, is active or live, and the process ends at block 416, from where the process moves to block 310. At block 310, the user makes a voice request, for example, to post "Hello Everyone" via Twitter®. As the application made a request at block 310, the process moves to block 314, where the application converts the request to post "Hello Everyone" on Twitter®, into a command that will be sent to the home server and waits for a response. With a response received, at block 316, the process moves to block 500, and to block 502.

At block 502, the application receives the voice data and the translation, and checks it against Google's translation and it matches, at block 504. The process moves to block 506, where the application parses the voice and recognizes that it can use Twitter's APIs to make a post. The process moves to block 518, where it is determined whether the home server 100 has multiple matches for commands. Here, there is only a single match, at block 518, so the process moves to block 522. At block 522, the device 110 via the home server 100, executes a command (e.g., an API command, generated by the home server 100), and asks the Twitter server for the most recent picture from the requested contact. The device 110 receives the image, and the process moves to block 524, where the device 110 completes the execution of the command, by causing the Twitter Server to send the image back to the device 110. The process is now finished at block 526 and moves to block 318.

At block 318, the response is a command, as it is a Twitter® post, and accordingly, the process moves to block 320. At block 320 the application (having been downloaded to and running on the device 110) accesses the command and follows the on-device actions to execute the command. Here, the application will message the user that it was successful posting on Twitter. The process moves to block 324 where it ends.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system or a cloud-based platform (such as those provided by Amazon Web Services™ or Microsoft® Azure™).

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, cloud-based platforms, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computerized method for performing tasks associated with an electronic service at an electronic destination comprising:

at a computer system, comprising at least one computer, receiving a request and a token issued to a device and the token linked to the device, the token active during a session which is open for a predetermined time period, the request to perform a task from the device, the performance of the task at an electronic destination, including at least one of a web page, a server, and, a computer;

authenticating the device;

should the device be authenticated, storing the request for the task;

at least the token providing the computer system access to the electronic destination associated with the request, for one or more requests for access to the electronic destination made from the device while the session is open; and, the computer system:

generating a list of Application Program Interface (API) commands for performing the task associated with the request, in response to having received the token to provide access to the electronic destination, at least one of the commands when executed: 1) causing the device to use the token to access the electronic destination associated with the request, and, 2) causing the device to perform the task of the request to provide access to features of the electronic service at the electronic destination at the computer system;

ranking the commands from the list of commands by probability;

selecting the command with the highest probability; and, parsing the selected command to be executable with a social media API.

2. The computerized method of claim 1, wherein the request is received via audio.

3. The computerized method of claim 1, wherein the request is received via at least one of text or menu selection.

4. The computerized method of claim 1, additionally comprising: transmitting the selected API command to the device for execution by the device.

5. The computerized method of claim 1, wherein the device includes at least one of: a smartphone, a computer, a desktop computer, a tablet computer, and, a laptop computer.

6. The computerized method of claim 1, wherein the at least one of the web page, server, or, computer, are associated with social media.

7. A computer system for performing tasks associated with an electronic service at an electronic destination comprising:

a computerized processing unit; and, a non-transitory storage media for storing computer components for in communication with the computerized processing unit, the computer components comprising:

a first component for receiving a request to perform a task from a device, and a token issued to the device and linked to the device, the token active during a session which is open for a predetermined time period, the performance of the task at an electronic destination, including at east one of a web page, a server, and a computer, the token providing the computer system access to the electronic destination associated with the request, for one or more requests made from the device while the session is open;

a second component for authenticating the device;

a third component, responsive to the device being authenticated, for storing the request for the task; and, a fourth component for:

generating a list of Application Program Interface (API) commands for performing the task associated with the request, at least one of the commands when executed: 1) causing the device to use the token to access the electronic destination associated with the request, and, 2) causing the device to perform the task of the request to provide access to features of the electronic destination at the computer system;

ranking the commands from the list of commands by probability:

selecting the command with the highest probability; and, parsing the selected command to be executable with a social media API.

8. The computer system of claim 7, wherein the first component is configured to receive the request via audio.

9. The computer system of claim 7, wherein the first component is configured to receive the request via at last one of text or menu selection.

10. The computer system of claim 7, additionally comprising: a fifth component for transmitting the selected API command to the device for execution by the device.

11. A computer usable non-transitory storage medium having a computer program embodied thereon for causing a suitably programmed computer system to perform tasks associated with an electronic service, by performing the following steps when such program is executed on the computer system, the steps comprising:

receiving a request and a token issued to a device and the token linked to the device, the request to perform a task from the device, the token active during a session which is open for a predetermined time period, the performance of the task at an electronic destination, including at last one of a web page, a server, and a computer, and, the token providing the computer system access to the electronic destination associated with the request, for one or more requests made from the device while the session is open;

authenticating the device;

should the device be authenticated, storing the request for the task; and, causing the computer system to:

generate a list of Application Program Interface (API) commands for performing the task associated with the request, at least one of the commands when executed: 1) causing the device to use the token to access the electronic destination associated with the request, and, 2) causing the device to perform the task of the request to provide access to features of the electronic destination at the computer system;

rank the commands from the list of commands by probability;

select the command with the highest probability; and, parse the selected command to be executable with a social media API.

12. The computer usable non-transitory storage medium of claim 11, wherein the request is received via audio.

13. The computer usable non-transitory storage medium of claim 11, wherein the request is received via at least one of text or menu selection.

14. The computer usable non-transitory storage medium of claim 11, wherein the steps additionally comprise: transmitting the selected API command to the device for execution by the device.

* * * * *